United States Patent
Akiyama

(10) Patent No.: US 10,209,527 B2
(45) Date of Patent: Feb. 19, 2019

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/872,886

(22) Filed: Jan. 16, 2018

(65) Prior Publication Data
US 2018/0210211 A1    Jul. 26, 2018

(30) Foreign Application Priority Data

Jan. 26, 2017  (JP) ................................ 2017-011969

(51) Int. Cl.
*G02B 27/09* (2006.01)
*G03B 21/20* (2006.01)
*G02F 1/1335* (2006.01)

(52) U.S. Cl.
CPC ... *G02B 27/0961* (2013.01); *G02F 1/133504* (2013.01); *G03B 21/2033* (2013.01)

(58) Field of Classification Search
CPC .. G03B 21/204; G03B 21/206; G03B 21/208; G03B 21/2013; G03B 21/2033; G03B 21/2053; G03B 21/2066; G02B 27/10; G02B 27/14; G02B 27/30; G02B 27/283; G02B 27/285
See application file for complete search history.

(56) References Cited

U.S. PATENT DOCUMENTS

| | | | | |
|---|---|---|---|---|
| 2003/0039036 A1* | 2/2003 | Kruschwitz | ........ | G02B 27/0927 359/707 |
| 2010/0328554 A1* | 12/2010 | Shibasaki | ............ | G03B 21/204 348/760 |
| 2012/0236264 A1* | 9/2012 | Akiyama | ........... | G03B 21/2013 353/37 |
| 2013/0242534 A1* | 9/2013 | Pettitt | .................. | G03B 21/204 362/84 |
| 2014/0146295 A1* | 5/2014 | Tatsuno | ................ | G02B 13/16 353/98 |
| 2016/0065919 A1* | 3/2016 | Miyata | ................. | G02B 26/008 353/31 |
| 2016/0091782 A1* | 3/2016 | Hashizume | .......... | G03B 21/204 353/84 |
| 2016/0170199 A1* | 6/2016 | Inoue | ..................... | G03B 21/14 348/761 |
| 2017/0059975 A1* | 3/2017 | Aizaki | .................. | G03B 33/12 |

FOREIGN PATENT DOCUMENTS

JP    2014-138148 A    7/2014

* cited by examiner

Primary Examiner — Sultan Chowdhury
(74) Attorney, Agent, or Firm — Oliff PLC

(57) ABSTRACT

An illuminator includes a light source apparatus that outputs light, a light collecting system on which the light is incident, and a diffuser element on which the collected light flux having exited out of the light collecting system is incident. The light includes a first light beam flux that occupies an area including the optical axis of the light collecting system and a second light beam flux that occupies the area outside the first light beam flux. The position where the first light beam flux is focused in the direction of the optical axis by the light collecting system differs from the position where the second light beam flux is focused in the direction of the optical axis by the light collecting system.

20 Claims, 6 Drawing Sheets

ILLUMINATOR AND PROJECTOR

BACKGROUND

1. Technical Field

The present invention relates to an illuminator and a projector.

2. Related Art

In recent years, there is a technology for an illuminator used in a projector, and two multi-lens arrays and light collector lenses are used to cause laser beams emitted from a laser array formed of a plurality of semiconductor lasers to be incident on a phosphor layer for generation of fluorescence (see JP-A-2014-138148, for example). The optical intensity distribution of the laser beam emitted from each of the semiconductor lasers has the Gaussian distribution, and the optical intensity in the central portion of the distribution is therefore higher than that in the peripheral portion thereof. In this case, the phosphor layer could undesirably be degraded by the heat, or the efficiency of conversion from the excitation light into the fluorescence could undesirably decreases. To eliminate the problem, in JP-A-2014-138148, the two multi-lens arrays and light collector lenses are used to homogenize the optical intensity distribution of each of the laser beams (excitation light) on the phosphor layer so that the peak value of the optical intensity is lowered.

However, in the technology of related art described above, the number of parts increases and the size of the apparatus therefore increases, undesirably resulting in an increase in cost. It is therefore desired to provide a new technology that provides a simple configuration that allows the peak value of the optical intensity to be lowered.

SUMMARY

An advantage of some aspects of the invention is to provide an illuminator that has a simple configuration but allows the peak value of the optical intensity to be lowered. Another advantage of some aspects of the invention is to provide a projector including the illuminator.

According to a first aspect of the invention, an illuminator is provided. The illuminator includes a light source apparatus that outputs light, a light collecting system on which the light is incident, and a diffuser element on which a collected light flux having exited out of the light collecting system is incident. The light includes a first light beam flux that occupies an area including an optical axis of the light collecting system and a second light beam flux that occupies an area outside the first light beam flux, and a position where the first light beam flux is focused in a direction of the optical axis by the light collecting system differs from a position where the second light beam flux is focused in the direction of the optical axis by the light collecting system.

The illuminator according to the first aspect provides a low peak value of the optical intensity distribution formed on the diffuser element by the first light beam flux and the second light beam flux, as compared with a case where the first light beam flux and the second light beam flux are focused in the same position in the direction of the optical axis.

Further, part of the amount of light in the central portion of the optical intensity distribution can be transferred to the peripheral portion thereof to increase the amount of light in the peripheral portion.

In the first aspect described above, it is preferable that the light collecting system has a first lens surface that selectively receives the first light beam flux and a second lens surface on which at least the second light beam flux is incident.

According to the configuration described above, using the first lens surface and the second lens surface allows the peak value of the optical intensity distribution to be lowered.

In the first aspect described above, it is preferable that the light collecting system includes a lens having the first lens surface and the second lens surface, that the first light beam flux is focused by the first lens surface, and that the second light beam flux is focused by the second lens surface.

According to the configuration described above, a single lens can be used to lower the peak value of the optical intensity distribution.

Instead, in the first aspect described above, it is preferable that the light collecting system includes a first lens having the first lens surface and a second lens having the second lens surface, and that the first lens is provided on an optical path between the light source apparatus and the diffuser element.

According to the configuration described above, using the first lens allows the focus position of the first light beam flux to be adjusted independently of the second light beam flux.

In the first aspect described above, it is preferable that at least one of the first lens surface and the second lens surface has an area formed of an aspheric surface.

According to the configuration described above, using an aspheric lens allows the focus positions to be readily controlled.

The aspheric surface may be an anamorphic surface.

According to the configuration described above, the shapes of spots formed on the diffuser element by the first light beam flux and the second light beam flux can be adjusted.

Instead, the aspheric surface may be a free-form surface.

According to the configuration described above, using a free-form surface allows improvement in the design flexibility of a lens surface, whereby the peak value of the optical intensity distribution can be readily lowered.

In the first aspect described above, it is preferable that the light collecting system has a second reflection curved surface on which at least the second light beam flux is incident and a first surface that selectively receives the first light beam flux.

According to the configuration described above, for example, using a reflection member that reflects light allows the peak value of the optical intensity distribution to decrease.

In the first aspect described above, it is preferable that a second diffuser element is provided on an optical path between the light source apparatus and the diffuser element.

According to the configuration described above, the second diffuser element diffuses the first light beam flux and the second light beam flux. The peak value of the optical intensity distribution on the diffuser element can therefore be lowered by a greater amount.

In the first aspect described above, it is preferable that the diffuser element is a phosphor layer.

According to the configuration described above, the peak value of the optical intensity distribution on the phosphor layer can be lowered. Bright fluorescence can therefore be generated.

According to a second aspect of the invention, a projector is provided. The projector includes the illuminator according to the first aspect described above, a light modulator that modulates illumination light outputted from the illuminator in accordance with image information to produce image light, and a projection system that projects the image light.

The projector according to the second aspect provides bright diffused light and can therefore display a bright, high-quality image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
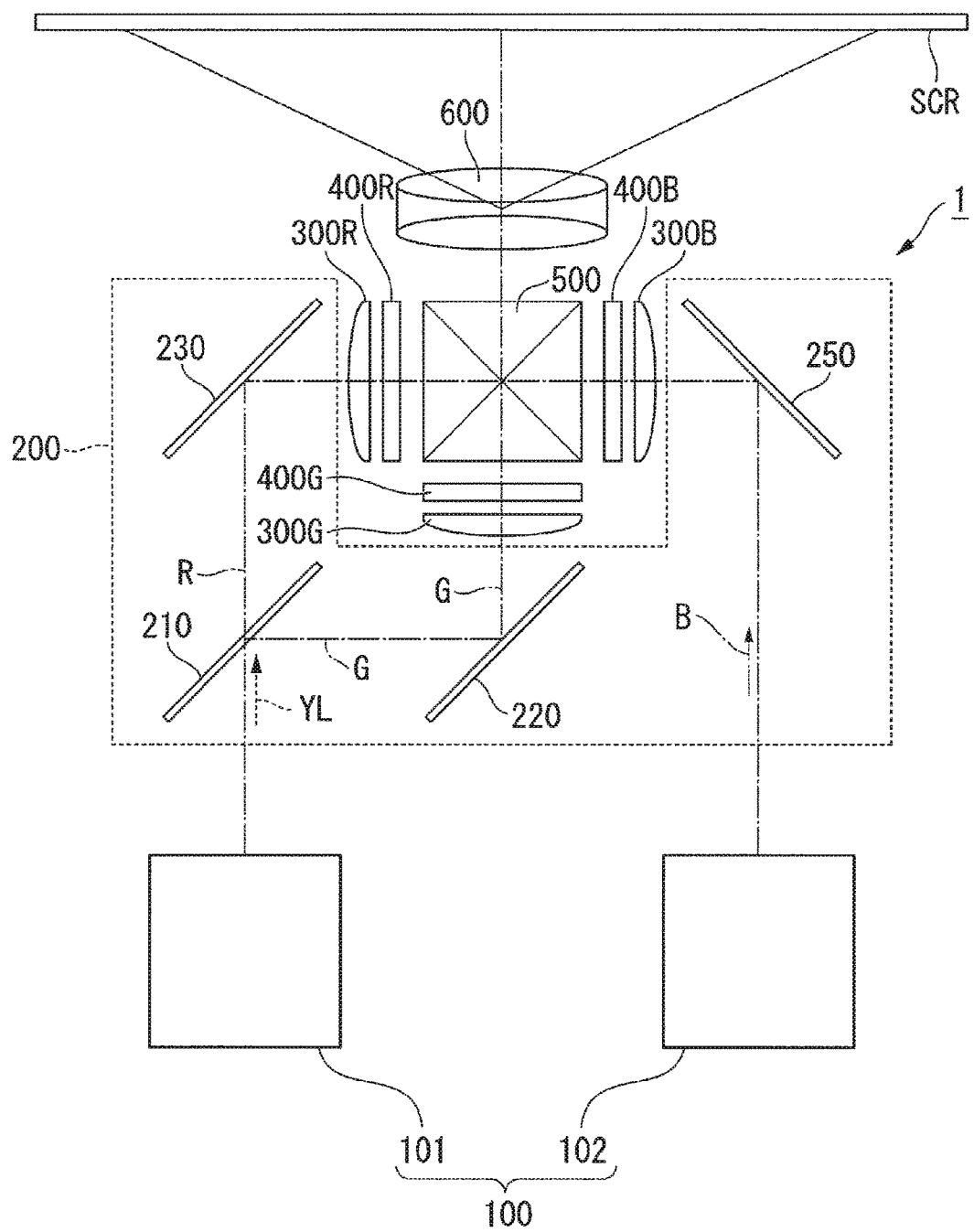
FIG. 1 is a schematic view showing the optical system of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

FIG. 1 is a schematic view showing the optical system of a projector according to an embodiment of the invention.

A projector 1 includes an illuminator 100, a color separation/light guide system 200, liquid crystal light modulators 400R, 400G, and 400B, a cross dichroic prism 500, and a projection system 600, as shown in FIG. 1.

The illuminator 100 includes a first illuminator 101 and a second illuminator 102. The first illuminator 101 outputs fluorescence YL containing red light and green light toward the color separation/light guide system 200. The second illuminator 102 outputs blue light B toward the color separation/light guide system 200.

The color separation/light guide system 200 includes a dichroic mirror 210 and reflection mirrors 220, 230, and 250. The color separation/light guide system 200 separates the yellow fluorescence YL outputted from the first illuminator 101 into red light R and green light G, guides the red light R and the green light G to the corresponding liquid crystal light modulators 400R and 400G, and guides the blue light B outputted from the second illuminator 102 to the liquid crystal light modulator 400B.

Field lenses 300R, 300G, and 300B are disposed between the color separation/light guide system 200 and the liquid crystal light modulators 400R, 400G, 400B, respectively.

The dichroic mirror 210 is a dichroic mirror that transmits the red light component and reflects the green light component. The reflection mirror 220 is a mirror that reflects the green light component. The reflection mirror 230 is a mirror that reflects the red light component. The reflection mirror 250 is a mirror that reflects the blue light component.

The red light R having passed through the dichroic mirror 210 is reflected off the reflection mirror 230, passes through the field lens 300R, and is incident on an image formation area of the liquid crystal light modulator 400R for red light. The green light G reflected off the dichroic mirror 210 is further reflected off the reflection mirror 220, passes through the field lens 300G, and is incident on an image formation area of the liquid crystal light modulator 400G for green light. The blue light B reflected off the reflection mirror 250 travels via the field lens 300B and is incident on an image formation area of the liquid crystal light modulator 400B for blue light.

The liquid crystal light modulators 400R, 400G, and 400B modulate the color light fluxes incident thereon in accordance with image information to form color images corresponding to the color light fluxes. Although not shown, light-incident-side polarizers are disposed on the light incident side of the liquid crystal light modulators 400R, 400G, and 400B. Light-exiting-side polarizers are disposed on the light exiting side of the liquid crystal light modulators 400R, 400G, and 400B.

The cross dichroic prism 500 combines the image light fluxes outputted from the liquid crystal light modulators 400R, 400G, and 400B with one another to form a color image. The cross dichroic prism 500 is formed by bonding four rectangular prisms to each other and thus has a roughly square shape in a plan view, and dielectric multilayer films are formed on the roughly X-letter-shaped interfaces between the bonded rectangular prisms.

The color image having exited out of the cross dichroic prism. 500 is enlarged and projected by the projection system 600 and forms an image on a screen SCR. The projection system 600 is formed of a plurality of projection lenses.

The configuration of the illuminator 100 will be subsequently described.

The configuration of the first illuminator 101, which forms the illuminator 100, will first be described.

Figure 2:
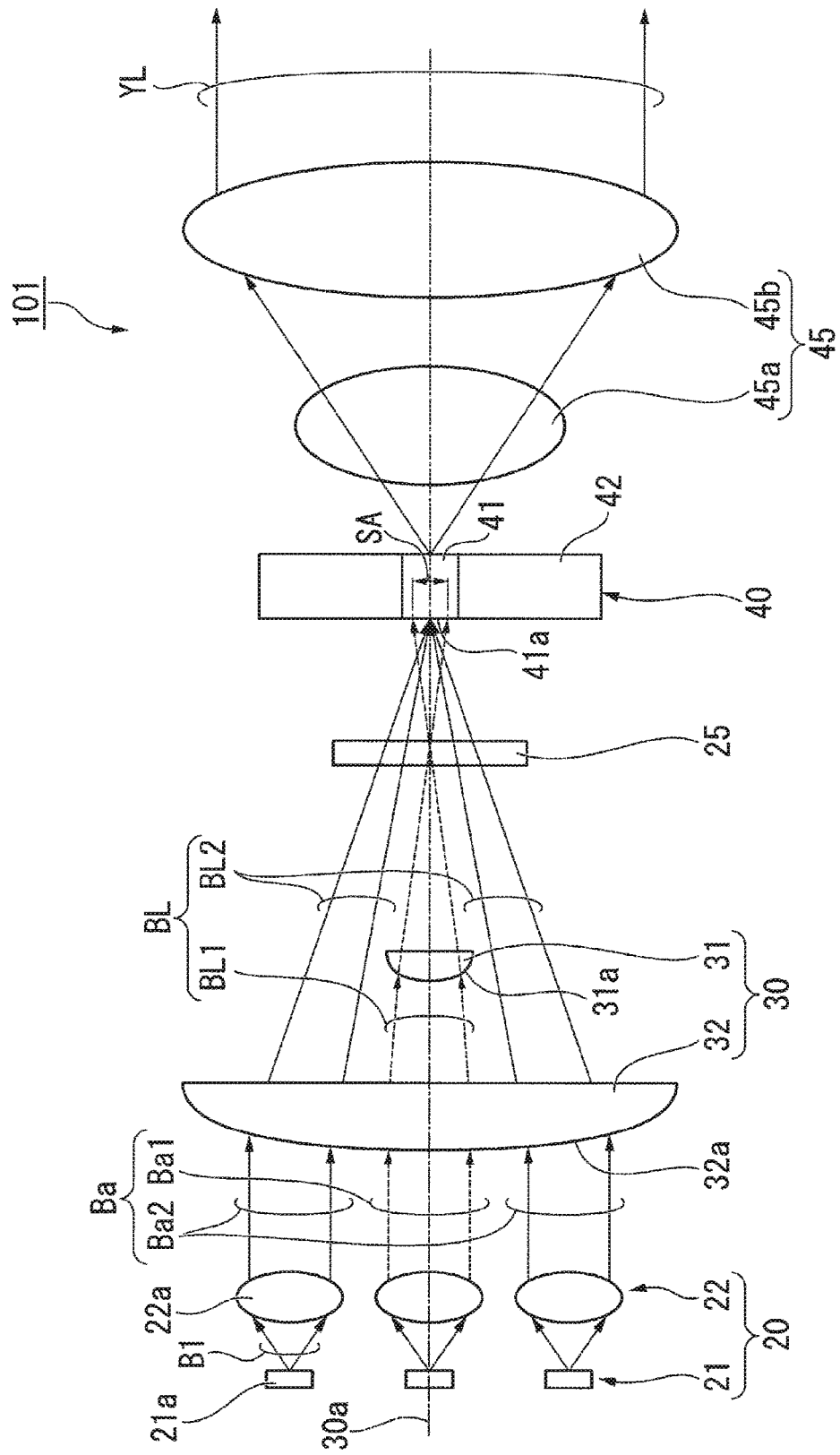
FIG. 2 shows a schematic configuration of a first illuminator.

FIG. 2 shows a schematic configuration of the first illuminator 101.

The first illuminator 101 includes a first light source apparatus 20, a diffuser member 25, a light collecting system 30, a fluorescence emitting element 40, and a pickup system 45, as shown in FIG. 2.

The first light source apparatus 20 includes an array light source 21 and a collimator system 22. The array light source 21 includes a plurality of semiconductor lasers 21a, each of which serves as a solid-state light source. The plurality of semiconductor lasers 21a are arranged in an array in a plane perpendicular to the optical axis.

The semiconductor lasers 21a each emit a blue light beam B1 (laser light having peak wavelength of 460 nm, for example). The array light source 21 outputs a light beam flux Ba formed of a plurality of light beams B1. In the present embodiment, the light beam flux Ba corresponds to the "light" in the appended claims.

The light beams B1 emitted from the array light source 21 are incident on the collimator system 22. The collimator system 22 converts the light beams B1 emitted from the array light source 21 into parallelized light fluxes.

The collimator system 22 includes, for example, a plurality of collimator lenses 22a arranged in an array. The plurality of collimator lenses 22a are arranged in correspondence with the plurality of semiconductor lasers 21a.

The light collecting system 30 collects the light beam flux Ba outputted from the first light source apparatus 20 and causes the collected light beam flux Ba to be incident on the fluorescence emitting element 40. The light beam flux Ba having been incident on the light collecting system 30 is hereinafter referred to as a light beam flux BL. In the present embodiment, the light collecting system 30 is formed of two lenses. The configuration of the light collecting system 30 will be described later. In the present embodiment, the light beam flux BL corresponds to the "collected light flux" in the appended claims.

The diffuser member 25 diffuses the light beam flux BL collected by the light collecting system 30. The diffuser member 25 diffuses the light beam flux BL to lower the peak value of the optical intensity of the light beam flux BL. The optical intensity distribution of the light beam flux BL can thus further be homogenized. The diffuser member 25 is manufactured, for example, by formation of irregularities on a surface of a member having light transparency.

In the present embodiment, the diffuser member 25 corresponds to the "second diffuser element" in the appended claims.

The diffuser member 25 is not an essential configuration and can be omitted.

The pickup system 45 includes a first lens 45a and a second lens 45b and picks up the fluorescence YL generated by the fluorescence emitting element 40 and converts the fluorescence YL into parallelized light.

Figure 3:
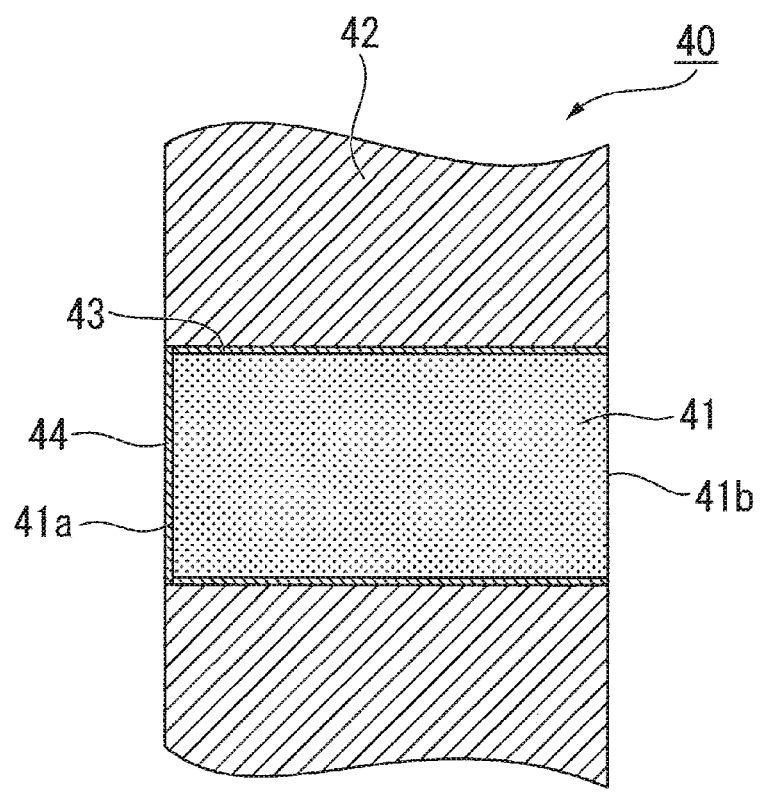
FIG. 3 shows the configuration of key parts of a fluorescence emitting element.

FIG. 3 is an enlarged view of key parts of the fluorescence emitting element 40.

The fluorescence emitting element 40 includes a phosphor layer 41, a support member 42, which supports the phosphor layer 41, a reflection layer 43, which is provided between the support member 42 and the phosphor layer 41, and a dichroic film 44, which is provided on a light incident surface 41a of the phosphor layer 41, as shown in FIG. 3. In the present embodiment, the phosphor layer 41 corresponds to the "diffuser element" in the appended claims.

The phosphor layer 41 contains phosphor particles (not shown) that absorb and convert excitation light (light beam flux BL) into the yellow fluorescence YL. For example, a YAG-based (yttrium-aluminum-garnet-based) phosphor is used as the phosphor particles.

The phosphor layer 41 may contain one type of phosphor particles or may contain two or more types of phosphor particles. The phosphor layer 41 is preferably made of a material that excels in heat resistance and surface processability. The phosphor layer 41 is preferably, for example, a phosphor layer in which phosphor particles are dispersed in an inorganic binder, such as alumina, or a phosphor layer formed of sintered phosphor particles using no binder.

The support member 42 is preferably made of a material that has high thermal conductivity and excels in heat dissipation, and examples of such a material include aluminum, copper or any other metal, or aluminum nitride, alumina, sapphire, diamond, or any other ceramic material. In the present embodiment, the support member 42 has the function as a member that dissipates heat generated by the phosphor layer 41.

A specific example of the reflection layer 43 may include a high-reflectance metal reflection film made, for example, of aluminum or silver. The reflection layer 43 reflects the fluorescence YL and the light beam flux BL. The light beam flux BL is thus efficiently used to generate the fluorescence YL. Further, the fluorescence YL is reflected off the reflection layer 43 and therefore satisfactorily guided toward a light exiting surface 41b of the phosphor layer 41.

The dichroic film 44 is characterized in that it transmits the light beam flux BL (blue light) but reflects the fluorescence YL (yellow light). The fluorescence YL generated by the phosphor layer 41 but directed toward the light incident surface 41a is therefore reflected off the dichroic film 44 and hence efficiently guided toward the light exiting surface 41b.

To efficiently generate the fluorescence YL, it is important to prevent the temperature of the phosphor layer 41 from excessively increasing. In a case where the optical intensity distribution of the light beam flux BL on the light incident surface 41a is not uniform, an area where the optical intensity is particularly high locally occurs, resulting in a decrease in the fluorescence generation efficiency due to the heat.

To avoid the decrease in the efficiency, in the present embodiment, the light collecting system 30 is used to lower the peak value of the optical intensity on the phosphor layer 41.

The specific configuration of the light collecting system 30 will be described below.

Referring back to FIG. 2, the light collecting system 30 includes a first lens 31 and a second lens 32. The first lens 31 and the second lens 32 are arranged along the direction of the optical axis 30a of the light collecting system 30 and provided on the optical path between the first light source apparatus 20 and the phosphor layer 41.

In the present embodiment, the light beam flux Ba incident on the light collecting system 30 includes a first light beam flux Ba1 and a second light beam flux Ba2. The first light beam flux Ba1 is light that is part of the light beam flux Ba and occupies an area including the optical axis 30a of the light collecting system 30. The second light beam flux Ba2 is light that is part of the light beam flux Ba and occupies the area outside the first light beam flux Ba1.

The first light beam flux Ba1 has, for example, a circular cross-sectional shape in a plane perpendicular to the optical axis 30a. The first light beam flux Ba1 does not necessarily have a circular cross-sectional shape and may have, for example, a band-shaped cross-sectional shape.

The first lens 31 is located in a position shifted from the second lens 32 toward the phosphor layer 41. The first lens 31 is formed, for example, of a planoconvex lens and has a first lens surface 31a. The first lens surface 31a is so disposed as to selectively receive the first light beam flux Ba1 out of the light beam flux Ba.

The second lens 32 is formed, for example, of a planoconvex lens and has a second lens surface 32a. The second lens surface 32a receives at least the second light beam flux Ba2. In the present embodiment, the second lens 32 is so disposed as to allow the entire light beam flux Ba (first light beam flux Ba1 and second light beam flux Ba2) to be incident on the second lens surface 32a.

The light collecting system 30 is so configured that the focus position of the first light beam flux Ba1 in the direction of the optical axis 30a differs from the focus position of the second light beam flux Ba2 in the direction of the optical axis 30a. The focus positions can each be controlled by changing the focal distance of the corresponding lens surface.

At least one of the first lens surface 31a and the second lens surface 32a may have an area formed of an aspheric surface. In the present embodiment, the first lens 31 and the second lens 32 are each formed of an aspheric lens having an aspheric surface (free-form surface, for example). Using a free-form surface allows improvement in the design flexibility of a lens surface, whereby the focus positions of the first light beam flux Ba1 and the second light beam flux Ba2 can be readily controlled.

In FIG. 2, the first light beam flux Ba1 collected by the light collecting system 30 is labeled with a first light beam flux BL1, and the second light beam flux Ba2 collected by the light collecting system 30 is labeled with a second light beam flux BL2.

In the present embodiment, the second lens 32 is so configured that the position where the second light beam flux BL2 is focused by the second lens surface 32a coincides with the surface of the phosphor layer 41 (light incident surface 41a). The first lens 31 is so configured that the positions where the first light beam flux BL1 is focused by the first lens surface 31a and the second lens surface 32a do not coincide with the surface of the phosphor layer 41 (light incident surface 41a).

The light beam flux Ba emitted from the array light source 21 is first incident on the second lens 32. The first light beam flux BL1 and the second light beam flux BL2 are so collected by the second lens 32 as to be focused on the surface of the phosphor layer 41 (light incident surface 41a).

The first light beam flux BL1 is, however, selectively received by the first lens 31 (first lens surface 31a). The first light beam flux BL1 is therefore so collected by the first lens 31 as to be focused in a position different from the position where the second light beam flux BL2 is focused (surface of phosphor layer 41).

According to the present embodiment, the first light beam flux BL1 is incident on the phosphor layer 41 with the light beam flux BL1 defocused (not in focus), and the second light beam flux BL2 is incident on the light incident surface 41a of the phosphor layer 41 with the light beam flux BL2 focused (in focus). In a case where the first light beam flux BL1 is formed of a plurality of light beam fluxes, the defocused first light beam flux BL1 forms a plurality of arrayed spots separate from one another on the phosphor layer 41.

On the other hand, the in-focus second light beam flux BL2 forms, on the phosphor layer 41, one spot that is an image conjugate with the light exiting surfaces of the semiconductor lasers 21a.

A description will now be made as Comparative Example a case where the first lens 31 of the light collecting system 30 is omitted, that is, a case where only the second lens 32 is used to collect the light beam flux BL. In this case, the first light beam flux BL1 and the second light beam flux BL2 are collected into one point on the phosphor layer 41. An illuminated area formed on the phosphor layer 41 by the first light beam flux BL1 and the second light beam flux BL2 is therefore formed of the one spot. Therefore, in the optical intensity distribution across the illuminated area, the optical intensity in the central portion is higher than the optical intensity in the peripheral portion, resulting in a decrease in fluorescence generation efficiency due to the heat in the central portion or degradation in the phosphor layer 41 due to the heat.

In contrast, in the case of the light collecting system 30 in the present embodiment, an illuminated area SA can be so formed on the light incident surface 41a of the phosphor layer 41 that the central portion of the illuminated area SA is formed by the first light beam flux BL1 and the second light beam flux BL2 and the peripheral portion thereof is formed by part of the first light beam flux BL1.

According to the light collecting system 30, the peak value of the optical intensity can be lowered as compared with the peak value in Comparative Example, and part of the amount of light in the central portion can be transferred to the peripheral portion to increase the amount of light in the peripheral portion. The first illuminator 101 can therefore efficiently generate the fluorescence YL.

The configuration of the second illuminator 102 will be subsequently described.

Figure 4:
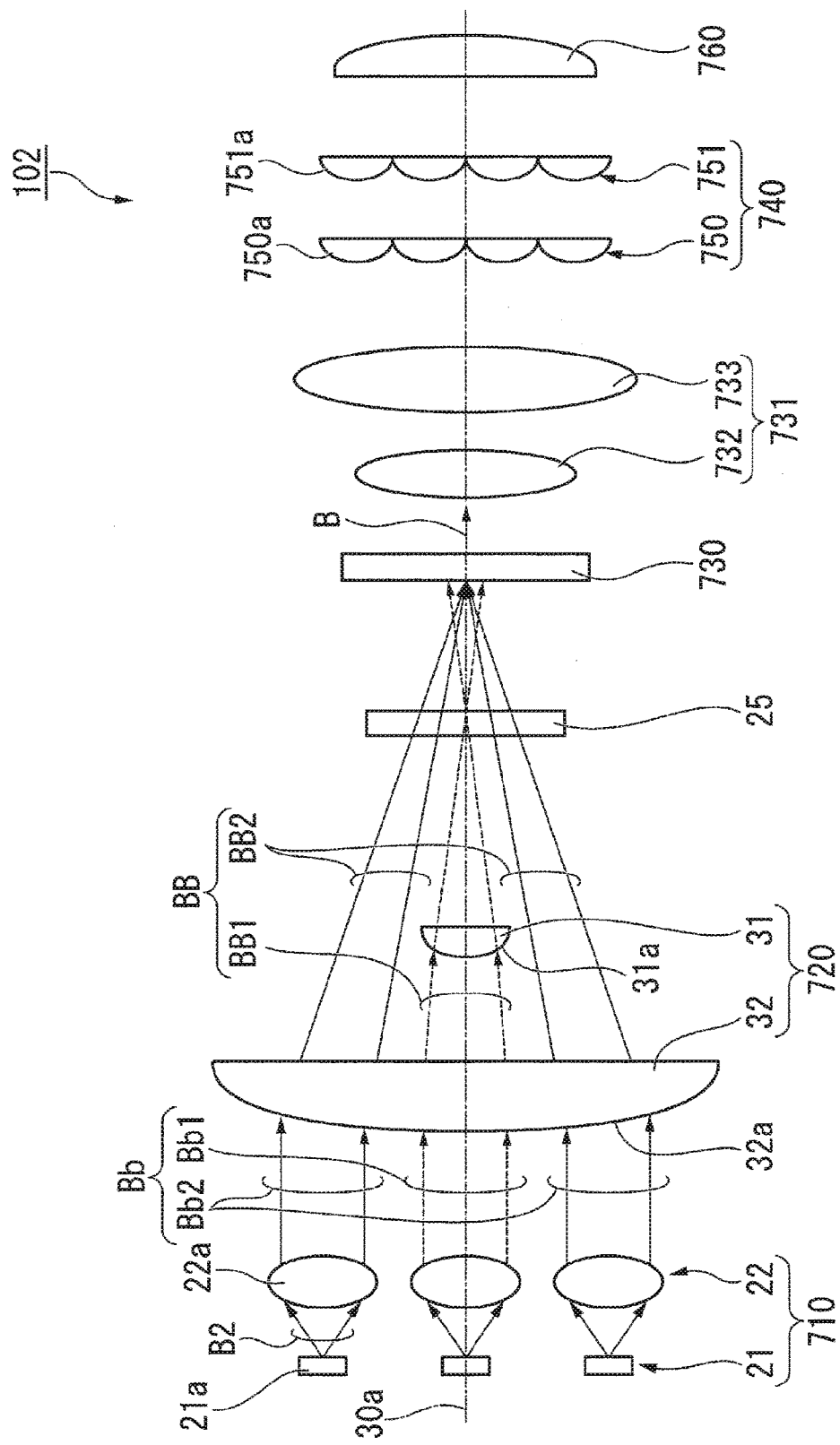
FIG. 4 shows a schematic configuration of a second illuminator.

FIG. 4 shows a schematic configuration of the second illuminator 102.

The second illuminator 102 includes a second light source apparatus 710, a light collecting system 720, a diffuser plate 730, a pickup system 731, a lens integrator system 740, and a superimposing lens 760, as shown in FIG. 4.

The second light source apparatus 710 has the same configuration as that of the first light source apparatus 20 of the first illuminator 101 and includes the array light source 21 and the collimator system 22. The thus configured second light source apparatus 710 can output a blue light beam flux Bb formed of a plurality of light beams B2 toward the light collecting system 720. In the second illuminator 102, the blue light beam flux Bb is used as image light. In the present embodiment, the blue light beam flux Bb corresponds to the "light" in the appended claims.

The light collecting system 720 collects the blue light beam flux Bb outputted from the second light source apparatus 710 and causes the collected blue light beam flux Bb to be incident on the diffuser plate 730. The blue light beam flux Bb having been incident on the light collecting system 720 is hereinafter referred to as a blue light beam flux BB. The light collecting system 720 has the same configuration as that of the light collecting system 30 of the first illuminator 101 and includes the first lens 31 and the second lens 32.

The blue light beam flux Bb includes a first light beam flux Bb1 and a second light beam flux Bb2. In FIG. 4, the first light beam flux Bb1 collected by the light collecting system 720 is labeled with a first light beam flux BB1, and the second light beam flux Bb2 collected by the light collecting system 720 is labeled with a second light beam flux BB2.

The light collecting system 720 can lower the peak value of the optical intensity on the diffuser plate 730 as compared with a case where the blue light beam flux BB is focused into one point. Brighter diffused light can therefore be produced by increasing the intensity of the blue light beam flux Bb with the amount of damage on the diffuser plate 730 suppressed.

The diffuser plate 730 scatters the blue light beam flux BB at a predetermined degree of scatter and forms blue light B having an light orientation distribution similar to that of the fluorescence YL emitted from the fluorescence emitting element 40. The diffuser plate 730 can be, for example, a ground glass plate made of optical glass.

The pickup system 731 includes lenses 732 and 733. The lenses 732 and 733 are each formed of a convex lens. The pickup system 731 parallelizes the blue light B scattered by the diffuser plate 730 and causes the parallelized blue light B to be incident on the lens integrator system 740.

The lens integrator system 740 includes lens arrays 750 and 751. The lens array 750 includes a plurality of lenslets 750a for dividing the blue light B into a plurality of sub-light fluxes. The lens array 751 includes a plurality of lenslets 751a corresponding to the plurality of lenslets 750a of the lens array 750. The lens array 751 along with the downstream superimposing lens 760 forms images of the lenslets 750a of the lens array 750 on the image formation area of the liquid crystal light modulator 400B or in the vicinity of the image formation area.

In the present embodiment, the blue light B outputted from the second illuminator 102 is reflected off the reflection mirror 250, passes through the field lens 300B, and is incident on the image formation area of the liquid crystal light modulator 400B for blue light.

The projector 1 according to the present embodiment, which includes the illuminator 100 described above, can display a bright image on the screen SCR.

In the first illuminator 101, the positional relationship between the first lens 31 and the second lens 32 in the direction of the optical axis 30a is not limited to a specific one, and the second lens 32 may be so disposed as to be closer to the phosphor layer 41 than the first lens 31.

Further, in the first illuminator 101, the case where the first lens 31 is formed of a convex lens is presented by way of example, but the first lens 31 may instead be formed of a concave lens.

Second Embodiment

An illuminator according to a second embodiment will subsequently be described. In the present embodiment, configurations and members common to those in the first embodiment have the same reference characters and will not be described in detail.

Figure 5:
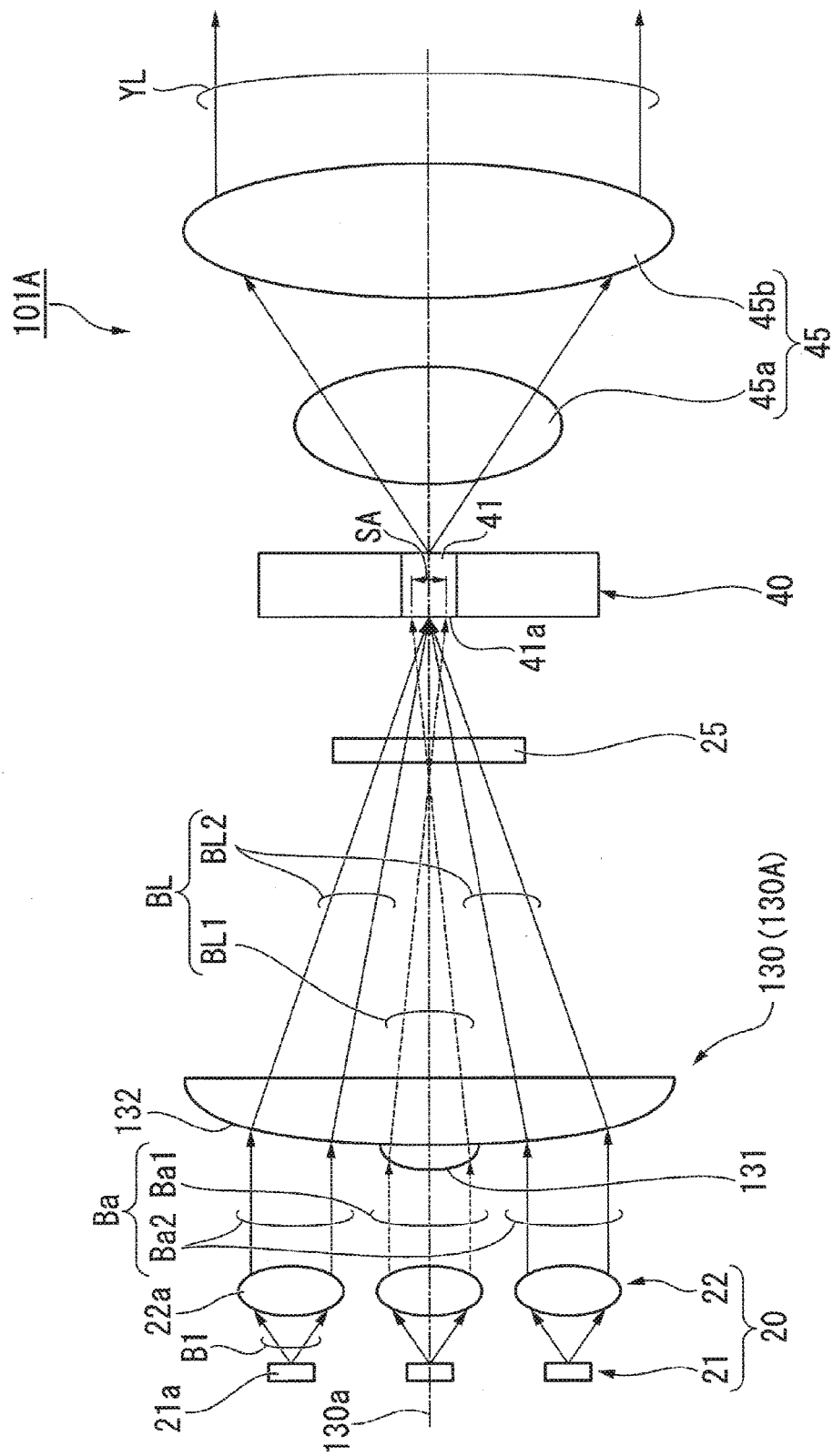
FIG. 5 shows a schematic configuration of a first illuminator according to a second embodiment.

FIG. 5 shows a schematic configuration of a first illuminator 101A according to the present embodiment. The first illuminator 101A includes the first light source apparatus 20, the diffuser plate 25, a light collecting system 130, the fluorescence emitting element 40, and the pickup system 45, as shown in FIG. 5.

The light collecting system 130 in the present embodiment is formed of one lens 130A and has an optical axis 130a. The lens 130A is formed of a multi-focal-point light collecting lens having two focal points. The lens 130A has a first lens surface 131 and a second lens surface 132, which are provided on the light incident side of the lens 130A.

The first lens surface 131 is provided in an area on which the first light beam flux Ba1 out of the light beam flux Ba is incident. The first lens surface 131 therefore selectively receives the first light beam flux Ba1.

The second lens surface 132 is provided in an area on which the second light beam flux Ba2 out of the light beam flux Ba is incident. In the present embodiment, the second lens surface 132 receives only the second light beam flux Ba2.

In the present embodiment, at least one of the first lens surface 131 and the second lens surface 132 may have an area formed of an aspheric surface. In the present embodiment, the first lens surface 131 and the second lens surface 132 are each formed of an aspheric surface (free-form surface, for example). Using a free-form surface allows improvement in the design flexibility of a lens surface, whereby the focus positions of the first light beam flux BL1 and the second light beam flux BL2 can be readily controlled.

The light collecting system 130 is so configured that the focus position of the first light beam flux BL1 in the direction of the optical axis 130a differs from the focus position of the second light beam flux BL2 in the direction of the optical axis 130a. The focus positions can each be controlled by changing the focal distance of the corresponding lens surface.

An effect of the light collecting system 130 will subsequently be described.

The first light beam flux BL1 is selectively received and focused by the first lens surface 131, and the second light beam flux BL2 is received and focused by the second lens surface 132.

In the present embodiment, the second lens surface 132 and the first lens surface 131 of the light collecting system 130 (lens 130A) are so designed that the focus position of the second light beam flux BL2 coincides with the surface of the phosphor layer 41 (light incident surface 41a) and the focus position of the first light beam flux BL1 does not coincide with the surface of the phosphor layer 41 (light incident surface 41a).

The thus configured light collecting system 130 causes the first light beam flux BL1 to be incident on the phosphor layer 41 with the first light beam flux BL1 defocused (not in focus) and the second light beam flux BL2 to be incident on the light incident surface 41a of the phosphor layer 41 with the light beam flux BL2 focused (in focus).

According to the light collecting system 130 in the present embodiment, the peak value of the optical intensity can be lowered, as in the first embodiment. As a result, bright fluorescence YL can be obtained by efficiently generating the fluorescence YL.

In the light collecting system 130, the positional relationship between the first lens surface 131 and the second lens surface 132 in the direction of the optical axis 130a is not limited to a specific one. For example, the second lens surface 132 may be provided as part of one of the light incident surface and the light exiting surface of the lens 130A, and the first lens surface 131 may be provided as part of the other one of the light incident surface and the light exiting surface.

Further, the case where the first lens surface 131 is so provided as to be convex with respect to the second lens surface 132 is presented by way of example, and the first lens surface 131 may instead be so provided as to be concave with respect to the second lens surface 132.

Moreover, the light collecting system 130 described above may be used as the light collecting system 720 in the second illuminator 102 in the first embodiment.

Third Embodiment

An illuminator according to a third embodiment will subsequently be described. In the present embodiment, configurations and members common to those in the first embodiment have the same reference characters and will not be described in detail.

Figure 6:
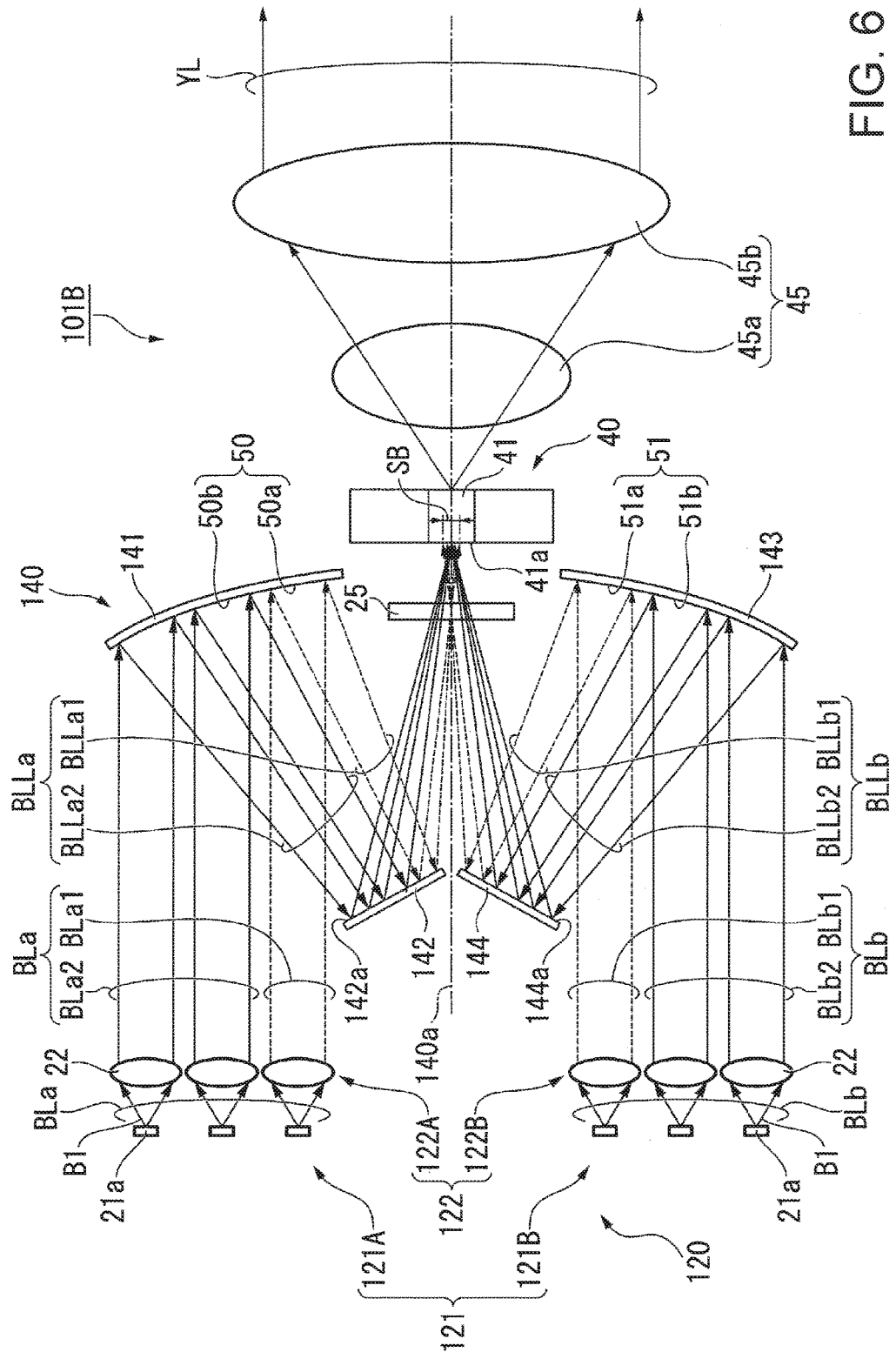
FIG. 6 shows a schematic configuration of a first illuminator according to a third embodiment.

FIG. 6 shows a schematic configuration of a first illuminator 101B according to the present embodiment. The first illuminator 101B according to the present embodiment includes a first light source apparatus 120, the diffuser plate 25, a light collecting system 140, the fluorescence emitting element 40, and the pickup system 45, as shown in FIG. 6.

The first light source apparatus 120 includes an array light source 121 and a collimator system 122. The array light source 121 includes a first array light source 121A and a second array light source 121B. The collimator system 122 includes a first collimator system 122A and a second collimator system 122B.

The first array light source 121A and the second array light source 121B each have the same configuration as that of the array light source 21 of the first light source apparatus 20 in the first embodiment and each include a plurality of semiconductor layers 21a, each of which serves as a solid-state light source and which are arranged in an array. The semiconductor lasers 21a each emit the blue light beam B1 (laser light having peak wavelength of 460 nm, for example). The first array light source 121A outputs a light beam flux BLa formed of a plurality of light beams B1. The second array light source 121B outputs a light beam flux BLb formed of a plurality of light beams B1.

The first collimator system 122A and the second collimator system 122B each have the same configuration as that of the collimator system 22 of the first light source apparatus in the first embodiment and includes a plurality of collimator lenses 22a arranged in an array. The plurality of collimator lenses 22a are arranged in correspondence with the plurality of semiconductor lasers 21a.

The first collimator system 122A converts the light beam flux BLa emitted from the first array light source 121A into a parallelized light flux. The second collimator system 122B converts the light beam flux BLb emitted from the second array light source 121B into a parallelized light flux.

The first light source apparatus 120 outputs the light beam flux BLa and the light beam flux BLb toward the light collecting system 140. The light beam fluxes BLa and BLb are each outputted along the direction of the optical axis 140a of the light collecting system 140. The light beam fluxes BLa and BLb each correspond to the "light" in the appended claims.

The light beam flux BLa includes a first light beam flux BLa1 and a second light beam flux BLa2. The light beam flux BLb includes a first light beam flux BLb1 and a second light beam flux BLb2.

The light collecting system 140 in the present embodiment includes a first concave reflection plate 141, a first reflection plate 142, a second concave reflection plate 143, and a second reflection plate 144.

The first concave reflection plate 141 has a reflection surface 50, which is formed of a concave surface that reflects the light beam flux BLa outputted from the first light source apparatus 120 toward the first reflection plate 142. The first reflection plate 142 has a reflection surface 142a, which reflects the light beam flux BLa reflected off the reflection surface 50 toward the fluorescence emitting element 40.

In the present embodiment, the first concave reflection plate 141 and the first reflection plate 142 collect the light beam flux BLa outputted from the first array light source 121A and cause the light beam flux BLa to be incident on the phosphor layer 41. The light beam flux BLa having been incident on the light collecting system 140 is hereinafter referred to as a light beam flux BLLa. In the present embodiment, the light beam flux BLLa corresponds to the "collected light flux" in the appended claims.

The first light beam flux BLa1 is light that occupies an area including the optical axis 140a of the light collecting system 140 (that is, area in the vicinity of the optical axis 140a). The second light beam flux BLa2 is light that occupies the area outside the first light beam flux BLa1 (area on the side opposite the optical axis 140a).

The reflection surface 50 of the first concave reflection plate 141 includes a first reflection surface 50a, on which the first light beam flux BLa1 is incident, and a second reflection surface 50b, on which the second light beam flux BLa2 is incident. The first reflection surface 50a and the second reflection surface 50b have radii of curvature different from each other. In the present embodiment, the first reflection surface 50a corresponds to the "first surface" in the appended claims, and the second reflection surface 50b corresponds to the "second reflection curved surface" in the appended claims.

In FIG. 6, the first light beam flux BLa1 collected by the light collecting system 140 is labeled with a first light beam flux BLLa1, and the second light beam flux BLa2 collected by the light collecting system 140 is labeled with a second light beam flux BLLa2.

The first concave reflection plate 141 is so configured that the position where the second light beam flux BLLa2 is focused by the second reflection surface 50b and the first reflection plate 142 coincides with the surface of the phosphor layer 41 and the position where the first light beam flux BLLa1 is focused by the first reflection surface 50a and the first reflection plate 142 does not coincide with the surface of the phosphor layer 41.

According to the present embodiment, the first light beam flux BLLa1 is allowed to be incident on the phosphor layer 41 with the first light beam flux BLLa1 defocused (not in focus), and the second light beam flux BLLa2 is allowed to be incident on the light incident surface 41a of the phosphor layer 41 with the light beam flux BLLa2 focused (in focus).

Similarly, the second concave reflection plate 143 has a reflection surface 51, which is formed of a concave surface that reflects the light beam flux BLb outputted from the first light source apparatus 120 toward the second reflection plate 144. The second reflection plate 144 has a reflection surface 144a, which reflects the light beam flux BLb reflected off the reflection surface 144a toward the fluorescence emitting element 40.

The second concave reflection plate 143 and the second reflection plate 144 collect the light beam flux BLb outputted from the second array light source 121B and cause the light beam flux BLb to be incident on the phosphor layer 41. The light beam flux BLb having been incident on the light collecting system 140 is hereinafter referred to as a light beam flux BLLb. In the present embodiment, the light beam flux BLLb corresponds to the "collected light flux" in the appended claims.

The first light beam flux BLb1 is light that occupies an area in the vicinity of the optical axis 140a. The second light beam flux BLb2 is light that occupies the area outside the first light beam flux BLb1 (area on the side opposite the optical axis 140a).

The reflection surface 51 of the second concave reflection plate 143 includes a first reflection surface 51a, on which the first light beam flux BLb1 is incident, and a second reflection surface 51b, on which the second light beam flux BLb2 is incident. In the present embodiment, the first reflection surface 51a corresponds to the "first surface" in the appended claims, and the second reflection surface 51b corresponds to the "second reflection curved surface" in the appended claims.

In FIG. 6, the first light beam flux BLb1 collected by the light collecting system 140 is labeled with a first light beam flux BLLb1, and the second light beam flux BLb2 collected by the light collecting system 140 is labeled with a second light beam flux BLLb2.

In the present embodiment, the second concave reflection plate 143 is so configured that the position where the second light beam flux BLLb2 is focused by the second reflection surface 51b coincides with the surface of the phosphor layer 41 and the position where the first light beam flux BLLb1 is focused by the first reflection surface 51a does not coincide with the surface of the phosphor layer 41.

According to the present embodiment, the first light beam flux BLLb1 is incident on the phosphor layer 41 with the first light beam flux BLLa1 defocused (not in focus), and the second light beam flux BLLb2 is incident on the light incident surface 41a of the phosphor layer 41 with the light beam flux BLLb2 focused (in focus).

On the light incident surface 41a of the phosphor layer 41 is formed an area SB illuminated with the first light beam fluxes BLLa1 and BLLb1 and the second light beam fluxes BLLa2 and BLLb2. The illuminated area SB has a central portion formed by the second light beam fluxes BLLa2 and BLLb2 and a peripheral portion formed by the first light beam fluxes BLLa1 and BLLb1.

According to the light collecting system 140 in the present embodiment, which can lower the peak value of the optical intensity, the fluorescence YL can be efficiently generated. The first illuminator 101B according to the present embodiment can therefore produce bright illumination light.

It is noted that the light collecting system 140 described above may be used as the light collecting system 720 in the second illuminator 102 in the first embodiment.

The present embodiment has been described with reference to the case where the reflection surface 50 of the first concave reflection plate 141 and the reflection surface 51 of the second concave reflection plate 143 are used to cause the focus positions of the first light beam fluxes BLa1 and BLb1 differ from the focus positions of the second light beam fluxes BLa2 and BLb2, but not necessarily in the invention.

For example, the reflection surfaces provided on the first reflection plate 142 and the second reflection plate 144 (corresponding to the "first surface" in the appended claims) may be used to cause the focus positions of the first light beam fluxes BLLa1 and BLLb1 to differ from the focus positions of the second light beam fluxes BLLa2 and BLLb2. Still instead, lens surfaces of lenses disposed in the optical paths of the first light beam fluxes BLLa1 and BLLb1 (corresponding to the "first surface" in the appended claims) may be used to cause the focus positions of the first light beam fluxes BLLa1 and BLLb1 differ from the focus positions of the second light beam fluxes BLLa2 and BLLb2.

The invention is not limited to the contents of the embodiments described above, and the embodiments described above can be changed as appropriate to the extent that the changes do not depart from the substance of the invention.

The light collecting system 30 described above may include an afocal system that adjusts the width of the light beam flux Ba. For example, placing an afocal system in a position upstream of the second lens 32 allows reduction in the diameter of the light beam flux Ba incident on the second lens 32. The size of the second lens 32 can therefore be reduced.

The light collecting system 130 described above may include an afocal system that adjusts the width of the light beam flux Ba. For example, placing an afocal system in a position upstream of the lens 130A allows reduction in the diameter of the light beam flux Ba incident on the lens 130A. The size of the lens 130A can therefore be reduced.

In the first embodiment, the spots formed on the phosphor layer 41 by the light beams B1 emitted from the semiconductor lasers 21a each have a rectangular shape having a large aspect ratio (elongated rectangular shape). In view of the fact described above, as each of the aspheric surfaces that form the first lens 31 and the second lens 32, a free-form surface may be replaced with an anamorphic surface.

Using an anamorphic surface allows the light beam flux BL (light beams B1) to form a quadrangular spot (roughly square spot, for example) having a small aspect ratio on the phosphor layer 41. As a result, the distance between the spots formed on the phosphor layer 41 is reduced, whereby the optical intensity distribution can be homogenized.

In the embodiments described above, the projector 1 including the three liquid crystal light modulators 400R, 400G, and 400B is presented by way of example. The invention is also applicable to a projector that displays color video images via a single liquid crystal light modulator. Further, a digital mirror device may be used as each of the light modulators.

In the embodiments described above, the case where the illuminator according to any of the embodiments of the invention is incorporated in a projector is presented by way of example, but not necessarily. The illuminator according to any of the embodiments of the invention may be used with a lighting apparatus, a headlight of an automobile, and other apparatus.

The entire disclosure of Japanese Patent Application No. 2017-011969, filed on Jan. 26, 2017 is expressly incorporated by reference herein.

What is claimed is:

1. An illuminator comprising:
  a light source apparatus that outputs light;
  a light collecting system on which the output light is incident, the light collecting system including a first lens and a second lens, the first lens being smaller than the second lens; and
  a diffuser element on which a collected light flux having exited out of the light collecting system is incident, wherein
  the output light includes: (i) a first light beam flux that occupies a first area including an optical axis of the light collecting system, and (ii) a second light beam flux that occupies a second area outside the first light beam flux, and
  the first light beam flux passes through the first lens and the second light beam flux does not pass through the first lens.

2. The illuminator according to claim 1, wherein
  a first position where the first light beam flux is focused in a direction of the optical axis by the light collecting system differs from a second position where the second light beam flux is focused in the direction of the optical axis by the light collecting system, and
  the light collecting system has a first lens surface that selectively receives the first light beam flux and a second lens surface on which at least the second light beam flux is incident.

3. The illuminator according to claim 2, wherein
  the first lens has the first lens surface the second lens has the second lens surface, and
  the first lens is provided on an optical path between the light source apparatus and the diffuser element.

4. A projector comprising:
  the illuminator according to claim 3;
  a light modulator that modulates illumination light outputted from the illuminator in accordance with image information to produce image light; and
  a projection system that projects the image light.

5. The illuminator according to claim 2, wherein at least one of the first lens surface and the second lens surface has an area formed of an aspheric surface.

6. The illuminator according to claim 5, wherein the aspheric surface is an anamorphic surface.

7. A projector comprising:
  the illuminator according to claim 6;
  a light modulator that modulates illumination light outputted from the illuminator in accordance with image information to produce image light; and
  a projection system that projects the image light.

8. The illuminator according to claim 5, wherein the aspheric surface is a free-form surface.

9. A projector comprising:
  the illuminator according to claim 8;
  a light modulator that modulates illumination light outputted from the illuminator in accordance with image information to produce image light; and
  a projection system that projects the image light.

10. A projector comprising:
the illuminator according to claim 5;
a light modulator that modulates illumination light outputted from the illuminator in accordance with image information to produce image light; and
a projection system that projects the image light.

11. A projector comprising:
the illuminator according to claim 2;
a light modulator that modulates illumination light outputted from the illuminator in accordance with image information to produce image light; and
a projection system that projects the image light.

12. The illuminator according to claim 1, wherein a second diffuser element is provided on an optical path between the light source apparatus and the diffuser element.

13. A projector comprising:
the illuminator according to claim 12;
a light modulator that modulates illumination light outputted from the illuminator in accordance with image information to produce image light; and
a projection system that projects the image light.

14. The illuminator according to claim 1, wherein the diffuser element is a phosphor layer.

15. A projector comprising:
the illuminator according to claim 14;
a light modulator that modulates illumination light outputted from the illuminator in accordance with image information to produce image light; and
a projection system that projects the image light.

16. A projector comprising:
the illuminator according to claim 1;
a light modulator that modulates illumination light outputted from the illuminator in accordance with image information to produce image light; and
a projection system that projects the image light.

17. An illuminator comprising:
a light source apparatus that outputs light;
a light collecting system on which the output light is incident; and
a diffuser element on which a collected light flux having exited out of the light collecting system is incident, wherein
the output light includes: (i) a first light beam flux that occupies a first area including an optical axis of the light collecting system, and (ii) a second light beam flux that occupies a second area outside the first light beam flux,
a first position where the first light beam flux is focused in a direction of the optical axis by the light collecting system differs from a second position where the second light beam flux is focused in the direction of the optical axis by the light collecting system,
the light collecting system has a first lens surface that selectively receives the first light beam flux and a second lens surface on which at least the second light beam flux is incident,
the light collecting system includes at least one lens having the first lens surface and the second lens surface,
the first light beam flux is focused by the first lens surface, and
the second light beam flux is focused by the second lens surface.

18. A projector comprising:
the illuminator according to claim 17;
a light modulator that modulates illumination light outputted from the illuminator in accordance with image information to produce image light; and
a projection system that projects the image light.

19. An illuminator comprising:
a light source apparatus that outputs light;
a light collecting system on which the output light is incident; and
a diffuser element on which a collected light flux having exited out of the light collecting system is incident, wherein
the output light includes: (i) a first light beam flux that occupies a first area including an optical axis of the light collecting system, and (ii) a second light beam flux that occupies a second area outside the first light beam flux,
a first position where the first light beam flux is focused in a direction of the optical axis by the light collecting system differs from a second position where the second light beam flux is focused in the direction of the optical axis by the light collecting system, and
the light collecting system has a second reflection curved surface on which at least the second light beam flux is incident and a first surface that selectively receives the first light beam flux.

20. A projector comprising:
the illuminator according to claim 19;
a light modulator that modulates illumination light outputted from the illuminator in accordance with image information to produce image light; and
a projection system that projects the image light.

* * * * *